US012187027B2

(12) United States Patent
Guttman et al.

(10) Patent No.: US 12,187,027 B2
(45) Date of Patent: Jan. 7, 2025

(54) QUALITY CONTROL IN A DIGITAL PRINTING SYSTEM

(71) Applicant: LANDA CORPORATION LTD., Rehovot (IL)

(72) Inventors: Avraham Guttman, Yavne (IL); Shai Silberstein, Ness Ziona (IL); Yoav Gross, Ramat Gan (IL)

(73) Assignee: LANDA CORPORATION LTD., Rehovot (IL)

( * ) Notice: Subject to any disclaimer, the term of this patent is extended or adjusted under 35 U.S.C. 154(b) by 202 days.

(21) Appl. No.: 18/069,232

(22) Filed: Dec. 21, 2022

(65) Prior Publication Data

US 2023/0202209 A1 Jun. 29, 2023

Related U.S. Application Data

(60) Provisional application No. 63/294,075, filed on Dec. 28, 2021.

(51) Int. Cl.

| | |
|---|---|
| ***B41J 11/00*** | (2006.01) |
| ***B41J 2/005*** | (2006.01) |
| ***B41J 13/22*** | (2006.01) |

(52) U.S. Cl.

CPC ......... *B41J 11/0095* (2013.01); *B41J 2/0057* (2013.01); *B41J 13/223* (2013.01); *B41J 2203/01* (2020.08)

(58) Field of Classification Search

CPC .... B41J 11/0095; B41J 2/0057; B41J 13/223; B41J 2203/01; B41J 2002/012

See application file for complete search history.

(56) References Cited

U.S. PATENT DOCUMENTS

| | | | |
|---|---|---|---|
| 2006/0175559 A1 | 8/2006 | Fischer et al. | |
| 2007/0144368 A1 | 6/2007 | Barazani et al. | |

(Continued)

FOREIGN PATENT DOCUMENTS

| | | |
|---|---|---|
| JP | 3712547 B2 | 11/2005 |
| JP | 2012081770 A | 4/2012 |

OTHER PUBLICATIONS

JP2012081770A Machine Translation (EPO, PlatPat and Google) published on Apr. 26, 2012 Komori Printing Mach.

(Continued)

*Primary Examiner* — Justin Seo
*Assistant Examiner* — Tracey M McMillion
(74) *Attorney, Agent, or Firm* — S.J. Intellectual Property LTD.

(57) ABSTRACT

A system and method for performing quality control in a digital printing system (DPS) is provided. The DPS includes an impression station for transferring an ink image from a surface of an intermediate transfer member to a substrate. The impression station includes an impression cylinder housing one or more grippers operable to grasp and hold a leading edge of the substrate as it passes through the DPS, for conveying the substrate along the impression cylinder during the transfer of the ink image. An imaging device is operable, during advancement of the substrate on the impression cylinder, to capture a digital image including a region of interest (ROI) that is associated with at least a portion of the grippers and at least a portion of the substrate. A controller is configured, based on the digital image, to indicate an error in a position of the substrate relative to the grippers.

20 Claims, 4 Drawing Sheets

(56) References Cited

U.S. PATENT DOCUMENTS

| | | | | |
|---|---|---|---|---|
| 2008/0101895 | A1 | 5/2008 | Holcomb et al. | |
| 2008/0295724 | A1 | 12/2008 | Lohweg et al. | |
| 2012/0280447 | A1 | 11/2012 | Kayanuma | |
| 2018/0281382 | A1 | 10/2018 | Umezawa et al. | |
| 2019/0152218 | A1* | 5/2019 | Stein | B41J 2/01 |
| 2019/0232638 | A1 | 8/2019 | Ziegenbalg et al. | |
| 2020/0156366 | A1* | 5/2020 | Shmaiser | B41J 3/60 |
| 2020/0376860 | A1 | 12/2020 | Paker et al. | |

OTHER PUBLICATIONS

JP3712547B2 Machine Translation (EPO, PlatPat and Google) published on Nov. 2, 2005 Sasaya Shunji.

* cited by examiner

QUALITY CONTROL IN A DIGITAL PRINTING SYSTEM

TECHNICAL FIELD

The invention relates to quality control in a digital printing system. In particular, the invention relates to a system and method for detecting an error in a position of a substrate relative to grippers in the digital printing system.

BACKGROUND

A digital printing device can use an indirect inkjet printing process in which an inkjet print head deposits ink droplets forming an ink image onto a surface of an intermediate transfer member (ITM), which, in turn, transfers the image onto a substrate. In order to ensure that the image on the ITM is accurately transferred onto the substrate, grippers that are mounted on a rotatable impression cylinder of the digital printing device grasp and hold the substrate during the transfer of the image from the ITM onto the substrate. However, in order to accurately transfer the image on the ITM onto the substrate, the grippers must grasp the substrate to achieve a predefined relation between a position of the substrate and the grippers.

Thus, there is a need in the art for a new system and method for detecting an error in a position of a substrate relative to grippers in a digital printing system.

References considered to be relevant as background to the presently disclosed subject matter are listed below. Acknowledgement of the references herein is not to be inferred as meaning that these are in any way relevant to the patentability of the presently disclosed subject matter.

U.S. Patent Application Publication No. 2020/0376860 ("Paker et al."), published on Dec. 3, 2020, provides a printing device that comprises a camera to capture an image of at least a portion of a print substrate; a controller to determine a location of a portion of a side edge of the substrate from the image to determine a distance of the print substrate from a predetermined location; and an adjustment apparatus to adjust the entire substrate laterally, relative to the direction of transport of the substrate, based on the determined location.

U.S. Patent Application Publication No. 2007/0144368 ("Barazani et al."), published on Jun. 28, 2007, discloses a system for printing an image on a printing media, comprising: a) an impression roller; b) a gripper which receives the printing media when the gripper is open, closes to hold the printing media to the impression roller while the image is printed, and opens to release the printing media from the impression roller; and c) at least one sensor which senses whether the gripper is open or closed.

U.S. Patent Application Publication No. 2008/0101895 ("Holcomb et al."), published on May 1, 2008, discloses a gripper assembly that includes at least one movable gripper jaw and a sensor member coupled for movement with the at least one gripper jaw. The sensor member includes a slot. A sensor is located at least partially within the slot and includes at least one inductor for inductively detecting a proximity of the sensor member.

U.S. Patent Application Publication No. 2012/0280447 ("Kayanuma"), published on Nov. 8, 2012, discloses a sheet caught between a clamper and a platen drum at its sheet front end portion. The clamper is provided with a pressing member with elasticity, and the pressing member has two projections. During conveyance, a pressing surface tightly comes into contact with the front-end portion of the sheet, while each projection is elastically deformed and compressed. When correcting skew of the sheet, the clamper is turned, while only the projections press the front-end portion of the sheet.

Japanese Patent No. 3712547 ("Mitsubishi Heavy Ind Ltd"), published on Nov. 2, 2005, discloses a sheet feeding control method for carrying a sheet from a feed board unit to a printing apparatus via a swing gripper in a sheet-fed printing machine, and a sheet situation when a sheet is transferred from the feed board unit to the swing gripper. JP 3712547 relates to an apparatus that detects fraudulent paper feeding.

Japanese Patent Application Publication No. 2012/081770 ("Kusaka"), published on Apr. 26, 2012, discloses significantly reducing a cost required for printing by preventing a sheet-like object from being wasted. When misregistration is detected by a register sensor detecting misregistration of the sheet-like object having the front end in contact with a registering part, a controller controls an inkjet printer to put a misregistration identification mark onto the sheet-like object. Simultaneously, the controller performs control such that cylinder extraction is performed by a cylinder extraction device to stack the sheet-like object having the misregistration on a defect pile.

U.S. Patent Application Publication No. 2018/0281382 ("Umezawa et al."), published on Oct. 4, 2018, provides a printing apparatus having a transfer member that moves to cyclically pass through a formation area of an ink image and a transfer area where the ink image is transferred to a cut sheet, and a supply that supplies the cut sheet to the transfer member continuously. The printing apparatus controls, when continuously printing on a plurality of cut sheets of the same size, stops the supply of the cut sheet based on a time taken to process image data representing an image of a print target, does not form the ink image in a partial area on the transfer member that passes through the transfer area at a timing when the supply of the cut sheet is stopped, and forms the ink image in a remaining area, while continuing the movement of the transfer member.

U.S. Patent Application Publication No. 2006/0175559 ("Fischer et al."), published on Aug. 10, 2006, discloses a device and a method for detecting the edge of a recording material, in particular, a printing plate, in an exposer for recording printing originals includes an exposer having an exposure drum holding the plate, and an exposure head moved axially along the drum and focusing exposure beams onto the plate. An optical fiber is let into the drum surface and an illuminating device, moved axially along the drum, radiates light radially into the fiber. A photodetector at the fiber receives the light radiated therein. Covering the light radiated in with the plate is used to detect the plate edge. Counting cycles of a feed drive moving the illuminating device determines an axial position of the edge. Alternatively, light of a light source is radiated axially into the fiber and the light emitted radially by the fiber is received using an optical detector moved by the feed drive.

U.S. Patent Application Publication No. 2019/0232638 ("Ziegenbalg et al."), published on Aug. 1, 2019, discloses a machine arrangement that sequentially processes sheet-like substrates with multiple different processing stations each having a substrate-guiding unit and a substrate-processing unit. At least one of the processing stations has, as a substrate-processing unit, at least one non-impact printing device which prints on the substrate. The processing station with the at least one non-impact printing device has a printing cylinder. Each non-impact printing device is arranged at the circumference of the printing cylinder. The printing cylinder is triple-sized or quadruple-sized. A double-sized or a triple-sized transfer drum, or a corresponding feed cylinder, is arranged directly upstream of this printing cylinder. Alternatively, a double-sized or a triple-sized transfer drum, or a corresponding transfer cylinder, is arranged directly downstream of this printing cylinder.

U.S. Patent Application Publication No. 2008/0295724 ("Lohweg et al."), published on Dec. 4, 2008, describes a method for detection of occurrence of printing errors on printed substrates during processing thereof on a printing press comprising the steps of providing multiple sensors on functional components of the printing press to monitor the behavior of the printing press during processing of the printed substrates and performing an in-line analysis of the behavior of the printing press to determine occurrence of a characteristic behavior of the printing press which leads or is likely to lead to occurrence of printing errors on the printed substrates or which leads or is likely to lead to good printing quality of the printed substrates. In-line analysis of the behavior of the printing press preferably includes performing fuzzy pattern classification of the behavior of the printing press. According to one embodiment of the proposed method in-line analysis of the behavior of the printing press is coupled with an in-line optical inspection of the printed substrates.

GENERAL DESCRIPTION

In accordance with a first aspect of the presently disclosed subject matter, there is provided a digital printing system, comprising: an intermediate transfer member (ITM), including a flexible belt, the ITM being operable to have an ink image formed on a surface thereof; an impression station configured to transfer the ink image from the surface of the ITM to a substrate, the impression station comprising: a rotatable impression cylinder having an impression cylinder gap housing one or more grippers operable to grasp and hold a gripper edge of the substrate, being a leading edge of the substrate as it passes through the digital printing system, for conveying the substrate along an axis of rotation of the rotatable impression cylinder during the transfer of the ink image, wherein a trailing end of the gripper edge separates between the gripper edge and a remaining portion of the substrate and coincides with a gripper bottom line of the grippers, and wherein a leading end of the gripper edge is opposite the trailing end of the gripper edge; and a rotatable pressure cylinder operative to rotate synchronously with the rotatable impression cylinder and in an opposing direction thereto to enable the transfer of the ink image as the surface of the ITM on which the ink image has been formed passes between the rotatable pressure cylinder and the rotatable impression cylinder; and an image quality control system comprising: an imaging device operable, during advancement of the substrate on the rotating impression cylinder, to capture a digital image including a region of interest (ROI) that is associated with at least a portion of the one or more grippers and at least a portion of the substrate, a top edge of the ROI being associated with the at least a portion of the one or more grippers and at least a portion of the gripper edge, and a bottom edge of the ROI being associated with at least a portion of the remaining portion of the substrate; and a controller configured to: determine a dark-bright transition point for each column of pixels of a plurality of distinct columns of pixels in the ROI, giving rise to dark-bright transition points for the plurality of distinct columns of pixels, wherein each column of pixels of the plurality of distinct columns of pixels extends from a top end of the top edge of the ROI to a bottom end of the bottom edge of the ROI; determine the leading end of the gripper edge by fitting the dark-bright transition points to a gripper edge model; subsequently determine the gripper bottom line of the grippers by fitting the dark-bright transition points that are more than a threshold number of pixels from the leading end of the gripper edge, being secondary dark-bright transition points, to a grippers model; compare the leading end of the gripper edge to the gripper bottom line of the grippers; determine, based on the compare, that at least one criterion of one or more criteria that are indicative of a proper relation between the leading end of the gripper edge and the gripper bottom line of the grippers is not met, being indicative of an error in a position of the substrate relative to the grippers; and perform one or more actions, based on determining that the at least one criterion is not met.

In some cases, the ROI is associated with all of a width of the substrate.

In some cases, the one or more criteria include a desired displacement range between the leading end of the gripper edge and the gripper bottom line of the grippers.

In some cases, the one or more criteria include a difference between a first slope of the leading end of the gripper edge and a second slope of the gripper bottom line of the grippers that is less than a predefined difference.

In some cases, the controller is configured to determine the dark-bright transition point for each column of pixels of the plurality of distinct columns of pixels by: providing a representative bright grey value and a representative dark grey value for the respective column of pixels; calculating a transition grey value for the respective column of pixels, based on the representative bright grey value and the representative dark grey value, the transition grey value being between the representative bright grey value and the representative dark grey value; and searching the respective column of pixels to determine a dark-bright transition pixel of the respective column of pixels, the dark-bright transition pixel having a given pixel grey value that relates to the transition grey value in accordance with a predefined relation; wherein the dark-bright transition point is the dark-bright transition pixel or a sub-pixel of the dark-bright transition pixel.

In some cases, the predefined relation is one of the following: (a) the given pixel grey value is either identical to the transition grey value or closest to the transition grey value from among pixel grey values of all of the pixels in the respective column of pixels; (b) the given pixel grey value is either identical to the transition grey value or closest to the transition grey value from among the pixel grey values of all of the pixels in the respective column of pixels that are less than the transition grey value; or (c) the given pixel grey value is either identical to the transition grey value or closest to the transition grey value from among the pixel grey values of all of the pixels in the respective distinct column of pixels that are greater than the transition grey value.

In some cases, the transition grey value is an average of the representative bright grey value and the representative dark grey value.

In some cases, the representative bright grey value is associated with a brightest pixel in the respective distinct column of pixels, and the representative dark grey value is associated with a darkest pixel in the respective distinct column of pixels.

In some cases, the controller is configured to determine the dark-bright transition point for each column of pixels of the plurality of distinct columns of pixels in the ROI by: providing a representative bright grey value and a representative dark grey value for the respective column of pixels; calculating a transition grey value for the respective column of pixels, based on the representative bright grey value and the representative dark grey value, the transition grey value being between the representative bright grey value and the representative dark grey value; searching the respective column of pixels to determine a dark-bright transition pixel of the respective column of pixels, the dark-bright transition pixel having a given pixel grey value that relates to the transition grey value in accordance with a predefined relation; defining a short column consisting of a group of pixels within the respective column of pixels that are within a given number of pixels of the dark-bright transition pixel; providing a second bright grey value and a second dark grey value for the short column; calculating a second transition grey value for the short column, based on the second bright grey value and the second dark grey value, the second transition grey value being between the second bright grey value and the second dark grey value; and searching the short column for a second dark-bright transition pixel, the second dark-bright transition pixel having a second given pixel grey value that relates to the second transition grey value in accordance with a second predefined relation; wherein the dark-bright transition point is the second dark-bright transition pixel or a sub-pixel of the second dark-bright transition pixel.

In some cases, the second predefined relation is one of the following: the second given pixel grey value is either identical to the second transition grey value or closest to the second transition grey value from among pixel grey values of all of the pixels in the short column; the second given pixel grey value is either identical to the second transition grey value or closest to the second transition grey value from among the pixel grey values of all of the pixels in the short column that are less than the second transition grey value; or the second given pixel grey value is either identical to the second transition grey value or closest to the second transition grey value from among the pixel grey values of all of the pixels in the short column that are greater than the second transition grey value.

In some cases, the second transition grey value is an average of the second bright grey value and the second dark grey value.

In some cases, the second bright grey value is associated with a brightest pixel in the short column, and the second dark grey value is associated with a darkest pixel in the short column.

In some cases, the gripper edge model is determined by applying a Random Sample Consensus (RANSAC) algorithm to the dark-bright transition points, and the grippers model is determined by applying the RANSAC algorithm to the secondary dark-bright transition points.

In some cases, the actions include one or more of the following: (a) providing an alert to an operator of the digital printing system, (b) rejecting the substrate or (c) suspending an operation of the digital printing system.

In some cases, the imaging device includes one of the following: (a) a scanner or (b) one or more cameras.

In accordance with a second aspect of the presently disclosed subject matter, there is provided a method for performing quality control in a digital printing system, the digital printing system comprising: an intermediate transfer member (ITM), including a flexible belt, the ITM being operable to have an ink image formed on a surface thereof; an impression station configured to transfer the ink image from the surface of the ITM to a substrate, the impression station comprising: a rotatable impression cylinder having an impression cylinder gap housing one or more grippers operable to grasp and hold a gripper edge of the substrate, being a leading edge of the substrate as it passes through the digital printing system, for conveying the substrate along an axis of rotation of the rotatable impression cylinder during the transfer of the ink image, wherein a trailing end of the gripper edge separates between the gripper edge and a remaining portion of the substrate and coincides with a gripper bottom line of the grippers, and wherein a leading end of the gripper edge is opposite the trailing end of the gripper edge; and a rotatable pressure cylinder operative to rotate synchronously with the rotatable impression cylinder and in an opposing direction thereto to enable the transfer of the ink image as the surface of the ITM on which the ink image has been formed passes between the rotatable pressure cylinder and the rotatable impression cylinder; and an image quality control system comprising: an imaging device operable, during advancement of the substrate on the rotating impression cylinder, to capture a digital image including a region of interest (ROI) that is associated with at least a portion of the one or more grippers and at least a portion of the substrate, a top edge of the ROI being associated with the at least a portion of the one or more grippers and at least a portion of the gripper edge, and a bottom edge of the ROI being associated with at least a portion of the remaining portion of the substrate; and a controller; the method, performed by the controller, and comprising: determining a dark-bright transition point for each column of pixels of a plurality of distinct columns of pixels in the ROI, giving rise to dark-bright transition points for the plurality of distinct columns of pixels, wherein each column of pixels of the plurality of distinct columns of pixels extends from a top end of the top edge of the ROI to a bottom end of the bottom edge of the ROI; determining the leading end of the gripper edge by fitting the dark-bright transition points to a gripper edge model; subsequently determining the gripper bottom line of the grippers by fitting the dark-bright transition points that are more than a threshold number of pixels from the leading end of the gripper edge, being secondary dark-bright transition points, to a grippers model; comparing the leading end of the gripper edge to the gripper bottom line of the grippers; determining, based on the comparing, that at least one criterion of one or more criteria that are indicative of a proper relation between the leading end of the gripper edge and the gripper bottom line of the grippers is not met, being indicative of an error in a position of the substrate relative to the grippers; and performing one or more actions, based on determining that the at least one criterion is not met.

In some cases, the ROI is associated with all of a width of the substrate.

In some cases, the one or more criteria include a desired displacement range between the leading end of the gripper edge and the gripper bottom line of the grippers.

In some cases, the one or more criteria include a difference between a first slope of the leading end of the gripper edge and a second slope of the gripper bottom line of the grippers that is less than a predefined difference.

In some cases, determining the dark-bright transition point for each column of pixels of the plurality of distinct columns of pixels is performed by: providing a representative bright grey value and a representative dark grey value for the respective column of pixels; calculating a transition grey value for the respective column of pixels, based on the representative bright grey value and the representative dark grey value, the transition grey value being between the representative bright grey value and the representative dark grey value; and searching the respective column of pixels to determine a dark-bright transition pixel of the respective column of pixels, the dark-bright transition pixel having a given pixel grey value that relates to the transition grey value in accordance with a predefined relation; wherein the dark-bright transition point is the dark-bright transition pixel or a sub-pixel of the dark-bright transition pixel.

In some cases, the predefined relation is one of the following: (a) the given pixel grey value is either identical to the transition grey value or closest to the transition grey value from among pixel grey values of all of the pixels in the respective column of pixels; (b) the given pixel grey value is either identical to the transition grey value or closest to the transition grey value from among the pixel grey values of all of the pixels in the respective column of pixels that are less than the transition grey value; or (c) the given pixel grey value is either identical to the transition grey value or closest to the transition grey value from among the pixel grey values of all of the pixels in the respective distinct column of pixels that are greater than the transition grey value.

In some cases, the transition grey value is an average of the representative bright grey value and the representative dark grey value.

In some cases, the representative bright grey value is associated with a brightest pixel in the respective distinct column of pixels, and the representative dark grey value is associated with a darkest pixel in the respective distinct column of pixels.

In some cases, determining the dark-bright transition point for each column of pixels of the plurality of distinct columns of pixels in the ROI is performed by: providing a representative bright grey value and a representative dark grey value for the respective column of pixels; calculating a transition grey value for the respective column of pixels, based on the representative bright grey value and the representative dark grey value, the transition grey value being between the representative bright grey value and the representative dark grey value; searching the respective column of pixels to determine a dark-bright transition pixel of the respective column of pixels, the dark-bright transition pixel having a given pixel grey value that relates to the transition grey value in accordance with a predefined relation; defining a short column consisting of a group of pixels within the respective column of pixels that are within a given number of pixels of the dark-bright transition pixel; providing a second bright grey value and a second dark grey value for the short column; calculating a second transition grey value for the short column, based on the second bright grey value and the second dark grey value, the second transition grey value being between the second bright grey value and the second dark grey value; and searching the short column for a second dark-bright transition pixel, the second dark-bright transition pixel having a second given pixel grey value that relates to the second transition grey value in accordance with a second predefined relation; wherein the dark-bright transition point is the second dark-bright transition pixel or a sub-pixel of the second dark-bright transition pixel.

In some cases, the second predefined relation is one of the following: the second given pixel grey value is either identical to the second transition grey value or closest to the second transition grey value from among pixel grey values of all of the pixels in the short column; the second given pixel grey value is either identical to the second transition grey value or closest to the second transition grey value from among the pixel grey values of all of the pixels in the short column that are less than the second transition grey value; or the second given pixel grey value is either identical to the second transition grey value or closest to the second transition grey value from among the pixel grey values of all of the pixels in the short column that are greater than the second transition grey value.

In some cases, the second transition grey value is an average of the second bright grey value and the second dark grey value.

In some cases, the second bright grey value is associated with a brightest pixel in the short column, and the second dark grey value is associated with a darkest pixel in the short column.

In some cases, the gripper edge model is determined by applying a Random Sample Consensus (RANSAC) algorithm to the dark-bright transition points, and the grippers model is determined by applying the RANSAC algorithm to the secondary dark-bright transition points.

In some cases, the actions include one or more of the following: (a) providing an alert to an operator of the digital printing system, (b) rejecting the substrate or (c) suspending an operation of the digital printing system.

In some cases, the imaging device includes one of the following: (a) a scanner or (b) one or more cameras.

In accordance with a third aspect of the presently disclosed subject matter, there is provided a non-transitory computer readable storage medium having computer readable program code embodied therein, the computer readable program code executable by a controller of a digital printing system to perform a method for performing quality control in the digital printing system, the digital printing system comprising: an intermediate transfer member (ITM), including a flexible belt, the ITM being operable to have an ink image formed on a surface thereof; an impression station configured to transfer the ink image from the surface of the ITM to a substrate, the impression station comprising: a rotatable impression cylinder having an impression cylinder gap housing one or more grippers operable to grasp and hold a gripper edge of the substrate, being a leading edge of the substrate as it passes through the digital printing system, for conveying the substrate along an axis of rotation of the rotatable impression cylinder during the transfer of the ink image, wherein a trailing end of the gripper edge separates between the gripper edge and a remaining portion of the substrate and coincides with a gripper bottom line of the grippers, and wherein a leading end of the gripper edge is opposite the trailing end of the gripper edge; and a rotatable pressure cylinder operative to rotate synchronously with the rotatable impression cylinder and in an opposing direction thereto to enable the transfer of the ink image as the surface of the ITM on which the ink image has been formed passes between the rotatable pressure cylinder and the rotatable impression cylinder; and an image quality control system comprising: an imaging device operable, during advancement of the substrate on the rotating impression cylinder, to capture a digital image including a region of interest (ROI) that is associated with at least a portion of the one or more grippers and at least a portion of the substrate, a top edge of the ROI being associated with the at least a portion of the one or more grippers and at least a portion of the gripper edge, and a bottom edge of the ROI being associated with at least a portion of the remaining portion of the substrate; and the controller; the method comprising: determining a dark-bright transition point for each column of pixels of a plurality of distinct columns of pixels in the ROI, giving rise to dark-bright transition points for the plurality of distinct columns of pixels, wherein each column of pixels of the plurality of distinct columns of pixels extends from a top end of the top edge of the ROI to a bottom end of the bottom edge of the ROI; determining the leading end of the gripper edge by fitting the dark-bright transition points to a gripper edge model; subsequently determining the gripper bottom line of the grippers by fitting the dark-bright transition points that are more than a threshold number of pixels from the leading end of the gripper edge, being secondary dark-bright transition points, to a grippers model; comparing the leading end of the gripper edge to the gripper bottom line of the grippers; determining, based on the comparing, that at least one criterion of one or more criteria that are indicative of a proper relation between the leading end of the gripper edge and the gripper bottom line of the grippers is not met, being indicative of an error in a position of the substrate relative to the grippers; and performing one or more actions, based on determining that the at least one criterion is not met.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings. The dimensions of components and features shown in the drawings are chosen for convenience and clarity of presentation and are not necessarily to scale. In the drawings.

DETAILED DESCRIPTION

Figure 1:
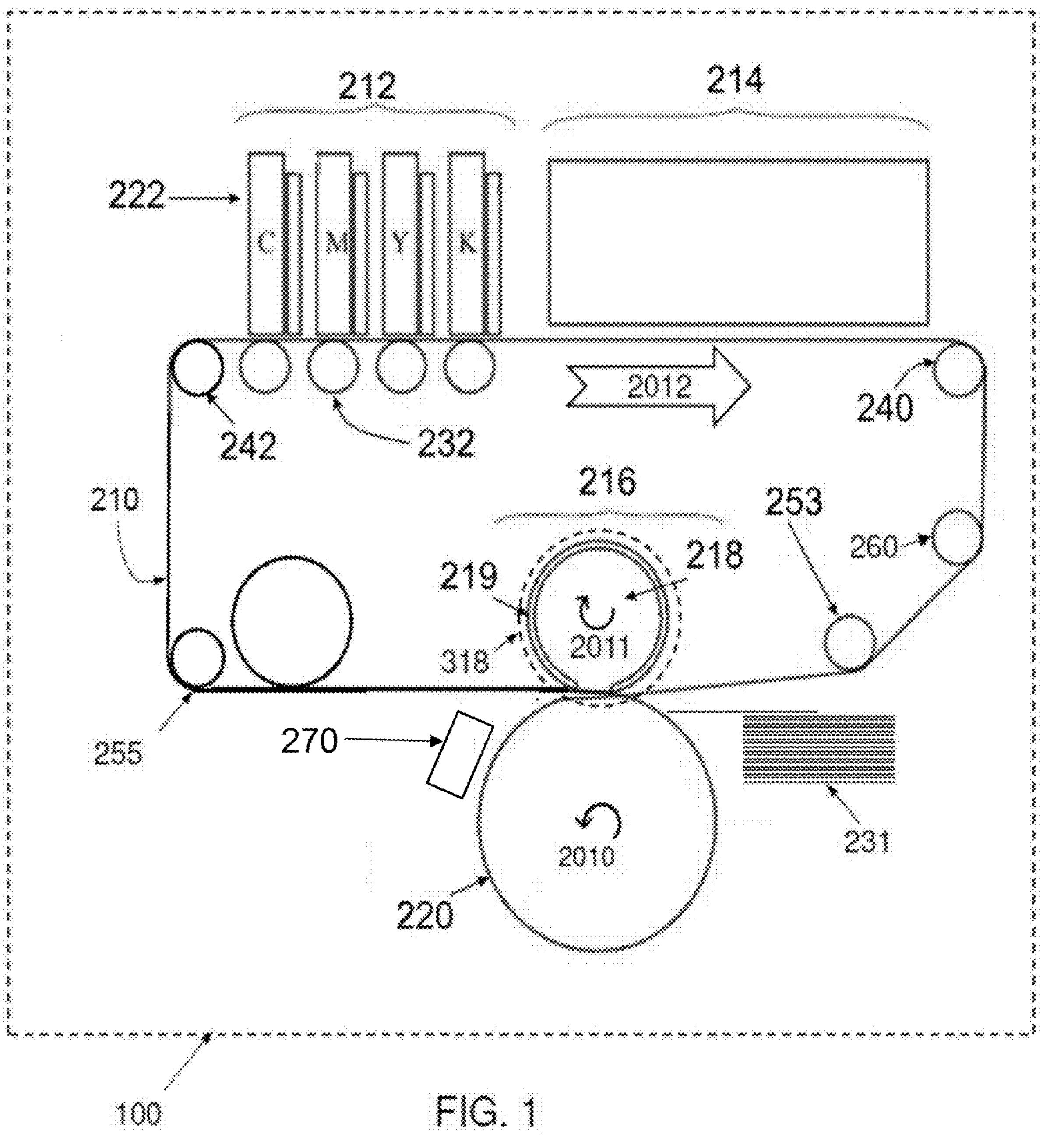
FIG. 1 is a schematic illustration of an elevation view of one example of a digital printing system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "capturing", "determining", "fitting", "comparing", "performing", "defining", "providing", "calculating", "searching", "applying", "rejecting", "suspending" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "an additional example", "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 5:
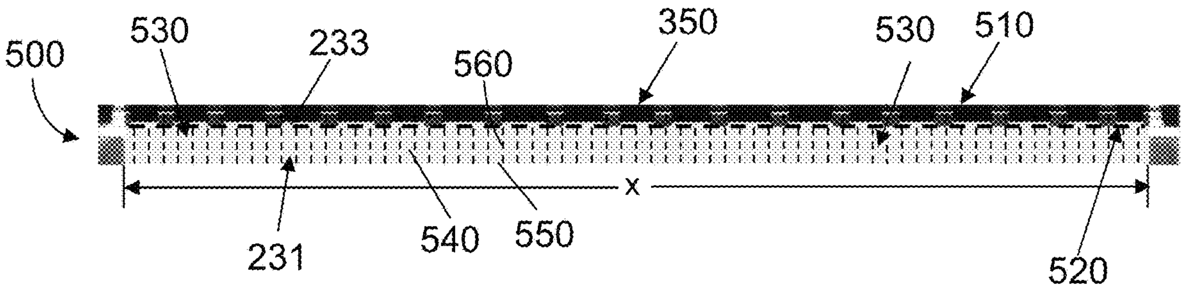
FIG. 5 is a schematic illustration of one example of a region of interest (ROI) within a digital image that is captured by the imaging device of the image quality control system, in accordance with the presently disclosed subject matter.
Figure 6:
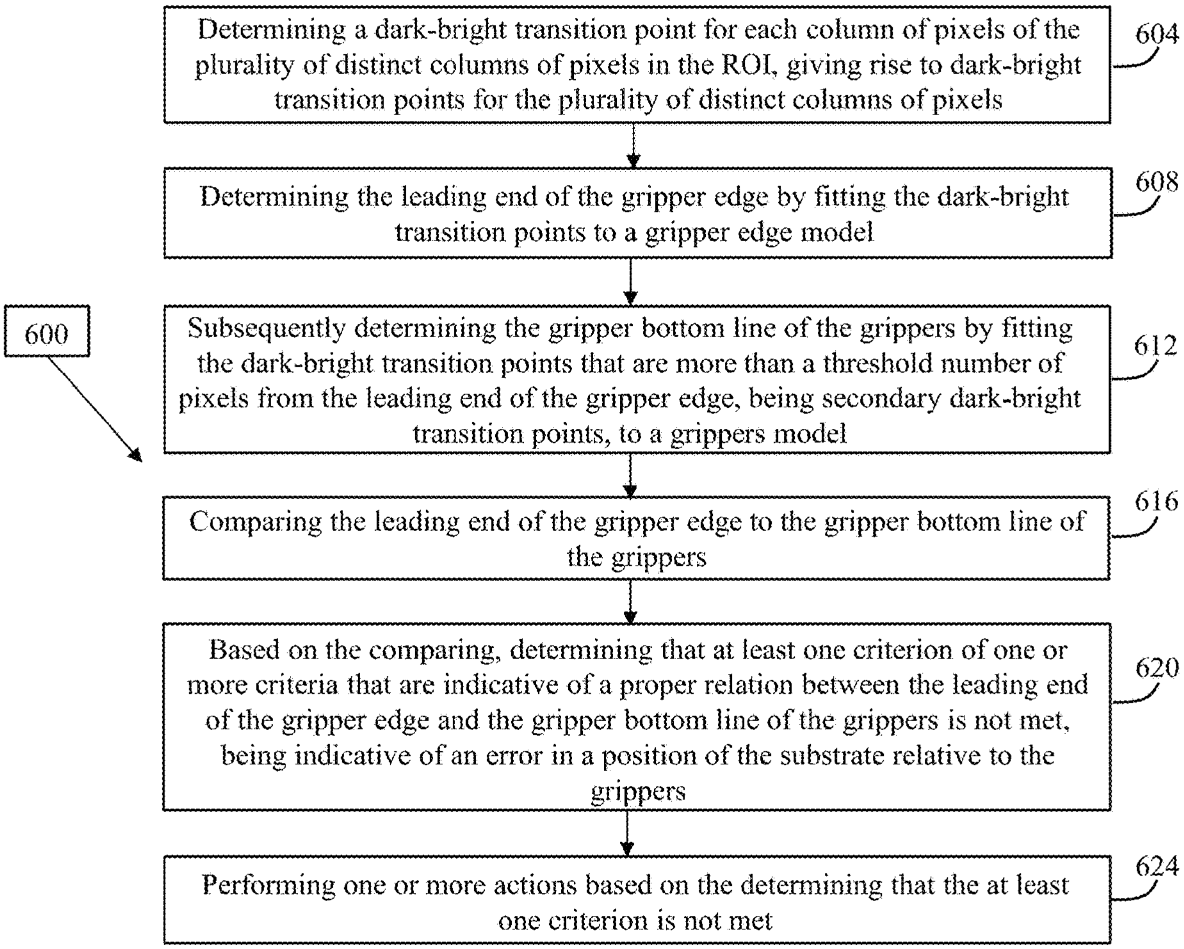
FIG. 6 is a flowchart illustrating one example of a sequence of operations for detecting an error in a position of a substrate relative to grippers in the digital printing system, in accordance with the presently disclosed subject matter.

In embodiments of the presently disclosed subject matter, fewer, more and/or different stages than those shown in FIG. 6 may be executed. FIGS. 1 to 5 illustrate a general schematic of the system architecture in accordance with embodiments of the presently disclosed subject matter. Each module in FIG. 4 can be made up of any combination of software, hardware and/or firmware that performs the functions as defined and explained herein. The modules in FIG. 4 may be centralized in one location or dispersed over more than one location. In other embodiments of the presently disclosed subject matter, the system may comprise fewer, more, and/or different modules than those shown in FIG. 4.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a schematic illustration of an elevation view of one example of a digital printing system 100, in accordance with the presently disclosed subject matter.

In accordance with the presently disclosed subject matter, digital printing system 100 is configured to include an intermediate transfer member (ITM) 210, the ITM 210 mounted over a plurality of guide rollers 232, 240, 260, 253, 255, 242. It is to be noted that the number and disposition of guide rollers as illustrated in FIG. 1 is for illustrative purposes only and is non-limiting. In the example of FIG. 1, the ITM 210 rotates in a clockwise direction, as illustrated by arrow 2012.

In some cases, the ITM 210 can be formed as a flexible or endless belt. In some cases, the ITM 210 can be formed as a flexible or endless belt comprising a reinforcement or support layer coated with a release layer.

Digital printing system 100 is configured to include an image forming station 212 and a drying station 214. Image forming station 212 is configured to comprise print bars 222 (each designated, for example, one of C, M Y and K). The image forming station 212 is configured, using the print bars 222, to deposit ink (e.g., by droplet deposition) on the ITM 210 for forming ink images on a surface of the ITM 210. Drying station 214 is configured to dry the ink images on the surface of the ITM 210.

Digital printing system 100 is further configured to include an impression station 216. The impression station 216 is configured to transfer an ink image that has been formed on the surface of the ITM 210 to a substrate 231, resulting in a printed image being formed on the substrate 231. The substrate 231 on which the printed image has been formed is referred to hereinafter, interchangeably, as a printed substrate 231. The substrate 231 is shown as a sheet-fed substrate, such as a paper or carton product, but it can alternatively be a continuous-feed (web) substrate. In some cases, digital printing system 100 can be configured to permit duplex printing (i.e., printing on both sides of the substrate 231), wherein to permit duplex printing, digital printing system 100 can be configured to include a plurality of impression stations.

The impression station 216 comprises a rotatable pressure cylinder 218 and a rotatable impression cylinder 220. In some cases, as illustrated in FIG. 1, the impression station 216 comprises a pressure cylinder assembly 318, which includes the rotatable pressure cylinder 218 and a compressible blanket 219 disposed around a large portion of the circumference of the rotatable pressure cylinder 218.

The rotatable pressure cylinder 218 is operative to rotate synchronously with the rotatable impression cylinder 220 and in an opposing direction thereto to enable the transfer of an ink image from a surface of the ITM 210 on which the ink image has been formed to a substrate 231, as the surface of the ITM 210 and the substrate 231 pass between the rotatable pressure cylinder 218 and the rotatable impression cylinder 220. In the illustration of FIG. 1, the rotatable impression cylinder 220 is rotatable in a counter-clockwise direction, as indicated by arrow 2010, so as to transport sheets of substrate 231. Moreover, the rotatable pressure cylinder 218 is rotatable in a clockwise direction, as illustrated by arrow 2011. In some cases, as is known in the art, gears and/or bearers on the rotatable pressure cylinder 218 and the rotatable impression cylinder 220 can be used to synchronize the rotation of the rotatable pressure cylinder 218 with the rotatable impression cylinder 220.

Digital printing system 100 is configured to include an image quality control system. Image quality control system is configured to include an imaging device 270 and a controller (not shown in FIG. 1), as detailed further herein, inter alia with reference to FIG. 4. The imaging device 270 can be positioned adjacent to the rotatable impression cylinder 220, as shown in FIG. 1, or at any other suitable location in the digital printing system 100 that allows inspection of the printed substrate 231.

The skilled artisan will appreciate that not every component that is illustrated in FIG. 1 is required. Also, it can be appreciated that digital printing system 100 can include additional features and components such as, for example, a cooling station or one or more cleaning stations.

The digital printing system 100 further comprises a substrate conveyor system (not shown) configured to move the substrate sheet along the impression station 216 and towards the output tray. In some cases, the substrate conveyor system can comprise a chain delivery (not shown), wherein the chain delivery is extended between an input tray of substrates 231 (shown in FIG. 1) and the output tray, via one or more impression stations, including, inter alia, impression station 216. The substrate conveyor system can further comprise grippers, including, inter alia, the one or more grippers 350 that are detailed further herein, inter alia with reference to FIGS. 2, 3 and 5. All of the grippers in the substrate conveyor system can be configured to grip and move a substrate 231 from the input tray to the output tray, e.g., along a chain delivery. Each gripper (or set of grippers) in the substrate conveyor system is configured to grip and move a substrate 231 along flat and curved surfaces, e.g., along a chain delivery. Further details regarding the substrate conveyor system can be found in International Patent Application Publication No. 2020/201889A1, published on Oct. 8, 2020, which is hereby incorporated by reference in its entirety.

Figure 2:
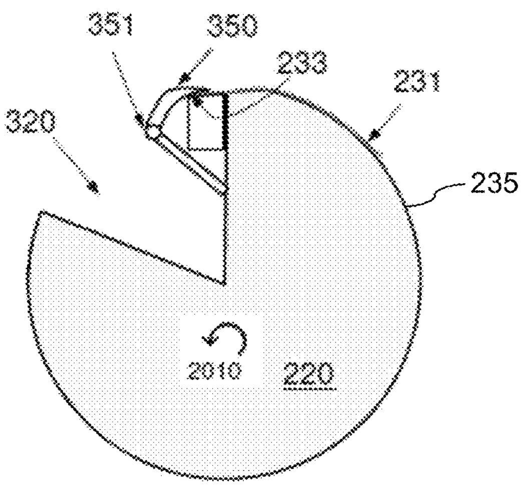
FIG. 2 is a schematic illustration of a cross-sectional view of one example of a rotatable impression cylinder, in accordance with the presently disclosed subject matter.

Attention is now drawn to FIG. 2, a schematic illustration of a cross-sectional view of one example of a rotatable impression cylinder 220, in accordance with the presently disclosed subject matter.

In accordance with the presently disclosed subject matter, rotatable impression cylinder 220 can be configured to have an impression cylinder gap 320 housing one or more grippers 350, for example as illustrated in FIG. 2. The grippers 350 are operable to grasp and hold a gripper edge 233 of a substrate 231, being a leading edge of the substrate 231, as the substrate 231 passes through the digital printing system 100, e.g., towards an output tray (not shown). Specifically, the grippers 350 are operable to grasp and hold a gripper edge of the substrate 231 for conveying the substrate 231 along a direction of rotation 2010 of the rotatable impression cylinder 220 during the transfer of an ink image from the ITM 210 to the substrate 231 and during an inspection of the printed substrate 231 by image quality control system (not shown in FIG. 2). In some cases, the grippers 350 can be attached to one end of a gripper bar 351, the opposite end of which is attached to the rotatable impression cylinder 220, as illustrated in FIG. 2. It is emphasized herein that the gripper configuration within the impression cylinder gap 320 as illustrated in FIG. 2, including, inter alia, grippers 350 and gripper bar 351, is a non-limiting example of a gripper configuration, and that any gripper configuration that is operable to grasp and hold a gripper edge of the substrate 231 for conveying the substrate 231 through the digital printing system 100 is within the scope of the present disclosure.

Figure 3:
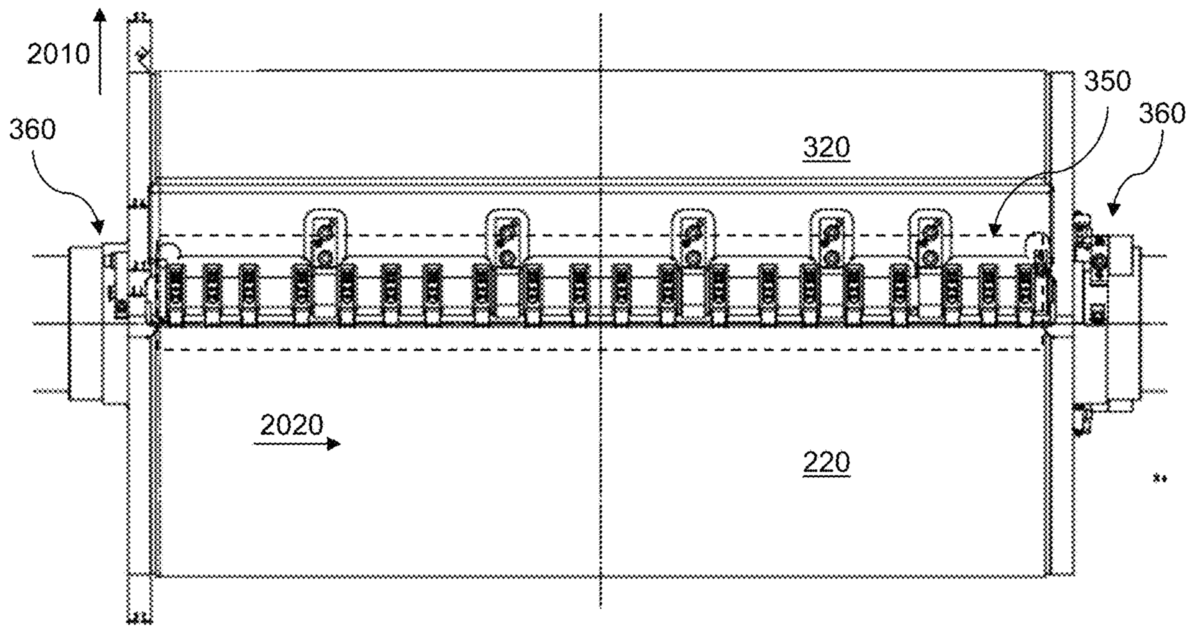
FIG. 3 is a schematic illustration of one example of an arrangement of a plurality of grippers, in accordance with the presently disclosed subject matter.

Attention is now drawn to FIG. 3, a schematic illustration of one example of an arrangement of a plurality of grippers 350, in accordance with the presently disclosed subject matter.

In accordance with the presently disclosed subject matter, rotatable impression cylinder 220 can be configured to include an impression cylinder gap 320. Rotatable impression cylinder 220, e.g., impression cylinder gap 320, can be configured to house one or more grippers 350, for example as illustrated in FIG. 2. In some cases, the grippers 350 can be a row of clips that are: (i) aligned along an axis direction 2020 that is perpendicular to the direction of rotation 2010 of the rotatable impression cylinder 220, and (ii) planar to an outer surface of the rotatable impression cylinder 220, as illustrated in FIG. 3, the row of clips being operable to grasp and hold the gripper edge of the substrate 231, as detailed earlier herein, inter alia with reference to FIG. 2. It is emphasized herein that the arrangement of the plurality of grippers 350 that is illustrated in FIG. 3 is a non-limiting example of an arrangement of one or more grippers 350, and that any arrangement of one or more grippers 350 that is operable to grasp and hold a gripper edge 233 of a substrate 231 is within the scope of the present disclosure. In some cases, rotatable impression cylinder 220 can be configured to include gears and/or bearers 360, as discussed earlier herein, inter alia with reference to FIG. 1.

Figure 4:
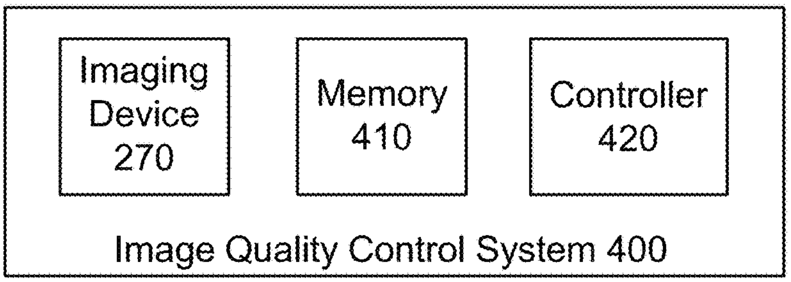
FIG. 4 is a block diagram of one example of an image quality control system, in accordance with the presently disclosed subject matter.

Attention is now drawn to FIG. 4, a block diagram of one example of an image quality control system 400, in accordance with the presently disclosed subject matter.

In accordance with the presently disclosed subject matter, an image quality control system 400 can be configured to include an imaging device 270 operable to capture a digital image, as detailed further herein, inter alia with reference to FIG. 5. The imaging device 270 can be located at any suitable location in the digital printing system 100 that allows for inspection of the printed substrate 231, for example as illustrated in FIG. 1. In some cases, the imaging device 270 can include one of the following: (a) a scanner or (b) one or more cameras. In some cases, the cameras can include any suitable image sensor, such as a Contact Image Sensor (CIS) or a Complementary Metal Oxide Semiconductor (CMOS) image sensor.

In some cases, image quality control system 400 can be configured to include a spectrophotometer (not shown) configured to monitor the quality of the ink printed on the printed substrate 231.

Image quality control system 400 can further comprise or be otherwise associated with a memory 410 (e.g., a database, a storage system, a memory including Read Only Memory-ROM, Random Access Memory-RAM, or any other type of memory, etc.) configured to store data. Memory 410 can be configured to store computer program instructions for performing a sequence of operations for detecting an error in a position of a printed substrate 231 relative to the grippers 350. In some cases, memory 410 can be further configured to enable retrieval and/or update and/or deletion of the stored data. It is to be noted that in some cases, memory 410 can be distributed.

Image quality control system 400 also comprises a controller 420. In some cases, the imaging device 270 and at least a part of the controller 420 can be located at a same location. Alternatively, the imaging device 270 and the controller 420 can be located at distinct locations.

Controller 420 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant image quality control system 400 resources, including, inter alia, imaging device 270, and for enabling operations related to image quality control system 400 resources. The operations related to the image quality control system 400 resources include, inter alia, a sequence of operations for detecting an error in a position of a printed substrate 231 relative to the grippers 350, based on a digital image that is captured by the imaging device 270, as detailed further herein, inter alia with reference to FIG. 6. It is to be noted herein that controller 420 can be configured to process an output of a spectrophotometer of the image quality control system 400, if the spectrophotometer is present.

In some cases, controller 420 can be configured to assess a quality of the image on the printed substrate 231. The quality of the image can be assessed by monitoring various attributes, such as but not limited to full image registration with printed substrate 231, color-to-color (CTC) registration, printed geometry, image uniformity, profile and linearity of colors, and functionality of the print nozzles. In some cases, controller 420 can be configured to automatically detect geometrical distortions or other errors in one or more of the aforementioned attributes. For example, controller 420 can be configured to compare between a design (i.e., expected) version of the image that is printed on the printed substrate 231 (also referred to herein as a "master" or a "source image" of the printed image) and the actual image on the printed substrate 231.

In some cases, controller 420 can be configured to apply any suitable type image processing software for detecting distortions indicative of the aforementioned errors. In some cases, controller 420 can be configured to analyze the detected distortions in order to apply a corrective action to the malfunctioning module, and/or to feed instructions to another module or station of digital printing system 100, so as to compensate for the detected distortion.

In some cases, digital printing system 100 can be configured to print testing marks (not shown), for example at the bevels or margins of the substrate 231. By acquiring images of the testing marks, by imaging device 270, controller 420 can be configured to measure various types of distortions, such as C2C registration, image-to-substrate registration, different width between colors referred to herein as "bar to bar width delta" or as "color to color width difference", various types of local distortions, and front-to-back registration errors (in duplex printing). In some cases, controller 420 can be configured to: (i) sort out, e.g., to a rejection tray (not shown), the printed substrate 231 having a distortion above a first predefined set of thresholds, (ii) initiate corrective actions for the printed substrate 231 having a distortion above a second, lower, predefined set of thresholds, and (iii) output the printed substrate 231 having minor distortions, e.g., below the second set of thresholds, to an output tray (not shown).

In some cases, controller 420 can be further configured to detect, e.g., by analyzing a pattern of the printed testing marks, additional geometric distortions such as scaling up or down, skew, or a wave distortion formed in at least one of an axis parallel to the movement axis of ITM 210 or an axis that is orthogonal to the movement axis of ITM 210.

In some cases, controller 420 can be configured to detect, based on signals received from the spectrophotometer (not shown), deviations in the profile and linearity of the printed colors.

In some cases, controller 420 can be configured to detect, based on the signals acquired by image quality control system 400, various types of defects in the printed substrate 231 or the ITM 210, such as a scratch, a pin hole, or a broken edge. In some cases, controller 420 can be configured to detect, based on the signals acquired by image quality control system 400, printing-related defects, such as irregular color spots, satellites, and splashes.

In some cases, controller 420 can be configured to detect these defects by comparing between an image of a section of the printed substrate 231 and a respective reference section of the design version of the image. In some cases, controller 420 can be further configured to classify the defects, and, based on the classification and predefined criteria, to reject the printed substrate 231 having defects that are not within the specified predefined criteria.

In some cases, controller 420 can be configured to decide whether to suspend the operation of digital printing system 100, for example, in case the defect density is above a specified threshold. In some cases, controller 420 can be configured to initiate corrective actions in the digital printing system 100. The corrective actions can be carried out on-the-fly (while digital printing system 100 continues the printing process), or offline, by stopping the printing operation and then carrying out the corrective actions. In some cases, another controller can be configured to start a corrective action or to stop the operation of digital printing system 100 in case the defect density is above a specified threshold.

It is to be noted herein that the operations performed by the controller 420, as listed above, are not intended to be limiting, and that the controller 420 can be configured to perform any operation for controlling the quality of the image printing process performed by the digital printing system 100.

Attention is now drawn to FIG. 5, a schematic illustration of one example of a region of interest (ROI) 500 within a digital image that is captured by the imaging device 270 of the image quality control system 400, in accordance with the presently disclosed subject matter.

In accordance with the presently disclosed subject matter, imaging device 270 is operable, during advancement of the printed substrate 231 on the rotating impression cylinder 220, to capture a digital image including a ROI 500 that is associated with at least a portion of the one or more grippers 350 and at least a portion of the printed substrate 231. In some cases, as illustrated in FIG. 5, the ROI 500 is associated with all of the one or more grippers 350. In some cases, as illustrated in FIG. 5, the ROI 500 is associated with all of the width 'x' of the substrate 231. The grippers 350 extend between a gripper top line 510 and a gripper bottom line 520.

The grippers 350 are operable to grasp and hold a gripper edge 233 of the substrate 231, being the leading edge of the substrate 231, for conveying the substrate 231 along an axis of rotation 2010 of the rotatable impression cylinder 220, e.g., towards an output tray (not shown). While the grippers 350 are conveying the substrate 231, the ink image from the ITM 210 is transferred to the substrate 231, as discussed earlier herein, inter alia with reference to FIG. 1, and the digital image is captured by the imaging device 270. A trailing end of the gripper edge 233 of the substrate 231 separates between the gripper edge 233 and a remaining portion 540 of the substrate 231 and coincides with the gripper bottom line 520 of the grippers 350. A leading end of the gripper edge 233, being a leading end of the substrate 231, is opposite the trailing end of the gripper edge 233. A top edge of the ROI 500 is associated with at least a portion of the one or more grippers 350 (in FIG. 5, all of the grippers 350) and at least a portion of the gripper edge 233 (in FIG. 5, all of the gripper edge 233), and a bottom edge of the ROI 500 is associated with at least a portion of the remaining portion 540 of the substrate 231.

The ROI 500 includes a plurality of distinct columns of pixels 530. Each column of pixels of the distinct columns of pixels 530 extends from a top end of the top edge of the ROI 500, being the gripper top line 510, to a bottom end 550 of the bottom edge of the ROI 500. Each column of pixels of the distinct columns of pixels 530 is represented in FIG. 5 by an area between two successive vertical dashed lines 560. It is noted that the distinct columns of pixels 530 in FIG. 5 are shown for illustrative purposes only and are not intended to be limiting.

Attention is now drawn to FIG. 6, a flowchart illustrating one example of a sequence of operations 600 for detecting an error in a position of a substrate 231 relative to grippers 350 in the digital printing system 100, in accordance with the presently disclosed subject matter.

In accordance with the presently disclosed subject matter, image quality control system 400 can be configured, e.g. using controller 420, to determine a dark-bright transition point for each column of pixels of the plurality of distinct columns of pixels 530 in the ROI 500 of a digital image that is captured by the imaging device 270, giving rise to dark-bright transition points for the plurality of distinct columns of pixels 530 (block 604).

In some cases, image quality control system 400 can be configured to determine the dark-bright transition point for each column of pixels of the plurality of distinct columns of pixels 530 by: (a) providing a representative bright grey value and a representative dark grey value for the respective column of pixels; (b) calculating a transition grey value for the respective column of pixels, based on the representative bright grey value and the representative dark grey value, the transition grey value being between the representative bright grey value and the representative dark grey value; and (c) searching the respective column of pixels to determine a dark-bright transition pixel of the respective column of pixels, the dark-bright transition pixel having a given pixel grey value that relates to the transition grey value in accordance with a predefined relation. In some cases, the dark-bright transition point for each column of pixels of the plurality of distinct columns of pixels 530 can be the dark-bright transition pixel of the respective column of pixels or a sub-pixel of the dark-bright transition pixel of the respective column of pixels.

In some cases, the sub-pixel of the dark-bright transition pixel that is associated with the dark-bright transition point for a respective column of pixels can be determined based on the pixel grey values of the pixels in the respective column of pixels that are closest to the dark-bright transition pixel, for example using a linear, cubic, or other interpolation. Alternatively, in some cases, the sub-pixel of the dark-bright transition pixel can be determined in accordance with a proximity of the pixel grey value of the dark-bright transition pixel to the transition grey value.

As described above, the dark-bright transition pixel for a respective column of pixels has a given pixel grey value that relates to the transition grey value for the respective column of pixels in accordance with a predefined relation. In some cases, the predefined relation can be that the given pixel grey value is either identical to the transition grey value or closest to the transition grey value from among pixel grey values of all of the pixels in the respective column of pixels. Alternatively, in some cases, the predefined relation can be that the given pixel grey value is either identical to the transition grey value or closest to the transition grey value from among the pixel grey values of all of the pixels in the respective column of pixels that are less than the transition grey value. As a further alternative, in some cases, the predefined relation can be that the given pixel grey value is either identical to the transition grey value or closest to the transition grey value from among the pixel grey values of all of the pixels in the respective distinct column of pixels that are greater than the transition grey value. It is to be noted herein that the predefined relation is not limited to the possibilities that are provided above.

In some cases, the transition grey value for a respective column of pixels of the distinct columns of pixels 530 can be a fixed value, i.e., not calculated based on a representative bright grey value and a representative dark grey value for the respective column of pixels.

In some cases, the transition grey value for a respective column of pixels of the plurality of distinct columns of pixels 530 can be an average of the representative bright grey value and the representative dark grey value for the respective column of pixels. Alternatively, in some cases, the transition grey value for the respective column of pixels can be calculated based on a statistical distribution of representative bright grey values and representative dark grey values for at least some of the distinct columns of pixels 530.

It is to be noted herein that the determination or calculation of the transition grey value for a respective column of pixels of the distinct columns of pixels 530 can be made or performed in any number of ways, not limited to the examples provided above.

In some cases, the representative bright grey value for a respective column of pixels of the plurality of distinct columns of pixels 530 can be associated with a brightest pixel in the respective column of pixels. For example, the representative bright grey value can be the grey value of a brightest pixel in the respective column of pixels. Additionally, or alternatively, in some cases, the representative dark grey value for a respective column of pixels of the plurality of distinct columns of pixels 530 can be associated with a darkest pixel in the respective column of pixels. For example, the representative dark grey value can be the grey value of a darkest pixel in the respective column of pixels.

In some cases, the representative bright grey value for a respective column of pixels of the plurality of distinct columns of pixels 530 can be the grey value of a bottommost pixel in the respective column of pixels. Additionally, or alternatively, in some cases, the representative dark grey value for a respective column of pixels of the plurality of distinct columns of pixels 530 can be the grey value of an uppermost pixel in the respective column of pixels.

In some cases, one or both of the representative bright grey value and the representative dark grey value for a respective column of pixels of the plurality of distinct columns of pixels 530 can be a pre-defined value that is irrespective of the actual grey values of any of the pixels in the respective column of pixels.

In some cases, at least one of the representative bright grey value and the representative dark grey value for a respective column of pixels of the plurality of distinct columns of pixels 530 can be determined in accordance with a statistical distribution of the pixel values of the pixels in the respective column of pixels.

In some cases, at least one of the representative bright grey value and the representative dark grey value for a respective column of pixels of the plurality of distinct columns of pixels 530 can be determined in accordance with a statistical distribution of the pixel values of the pixels in two or more given columns of pixels of the plurality of distinct columns of pixels 530. In some cases, the given columns of pixels can be all of the distinct columns of pixels 530. It is noted herein that the determination of the representative bright grey value and the representative dark grey value for a respective column of pixels can be made in any number of ways, not limited to the examples provided above.

In some cases, upon determining the dark-bright transition pixel for each column of pixels of the distinct columns of pixels 530, image quality control system 400 can be configured, e.g. using controller 420, to perform the following for each column of pixels of the distinct column of pixels 530 to determine the dark-bright transition point for the respective column of pixels: (a) defining a short column consisting of a group of pixels within the respective column of pixels that are within a given number of pixels of the dark-bright transition pixel; (b) providing a second bright grey value and a second dark grey value for the short column; (c) calculating a second transition grey value for the short column, based on the second bright grey value and the second dark grey value, the second transition grey value being between the second bright grey value and the second dark grey value; and (d) searching the short column for a second dark-bright transition pixel, the second dark-bright transition pixel having a second given pixel grey value that relates to the second transition grey value in accordance with a second predefined relation. In this example, the dark-bright transition point for the respective column of pixels is the second dark-bright transition pixel, or a sub-pixel of the second dark-bright transition pixel. In some cases, the sub-pixel of the second dark-bright transition pixel that is associated with the dark-bright transition point for a respective column of pixels can be determined based on the pixel grey values of the pixels in the short column of the respective column of pixels that are closest to the second dark-bright transition pixel, for example using a linear, cubic, or other interpolation.

In some cases, the second predefined relation can be that the second given pixel grey value is either identical to the second transition grey value or closest to the second transition grey value from among pixel grey values of all of the pixels in the short column. Alternatively, in some cases, the second predefined relation can be that the second given pixel grey value is either identical to the second transition grey value or closest to the second transition grey value from among the pixel grey values of all of the pixels in the short column that are less than the second transition grey value. As a further alternative, in some cases, the second predefined relation can be that the second given pixel grey value is either identical to the second transition grey value or closest to the second transition grey value from among the pixel grey values of all of the pixels in the short column that are greater than the second transition grey value. In some cases, the predefined relation (defined above) and the second predefined relation can be the same. It is to be noted herein that the second predefined relation is not limited to the possibilities that are provided above.

In some cases, the second transition grey value for a short column of a respective column of pixels of the distinct columns of pixels 530 can be an average of the second bright grey value for the short column and the second dark grey value for the short column. Alternatively, in some cases, the second transition grey value for the short column can be calculated based on a statistical distribution of second bright grey values and second dark grey values for at least some of the short columns of the distinct columns of pixels 530.

It is to be noted herein that the determination or calculation of the second transition grey value for a short column of a respective column of pixels of the distinct columns of pixels 530 can be made or performed in any number of ways, not limited to the examples provided above.

In some cases, the second bright grey value for a short column within a respective column of pixels of the distinct columns of pixels 530 can be associated with a brightest pixel in the short column. For example, the second bright grey value can be the grey value of a brightest pixel in the short column. Additionally, or alternatively, in some cases, the second dark grey value for a short column within a respective column of pixels of the distinct columns of pixels 530 can be associated with a darkest pixel in the short column. For example, the second dark grey value can be the grey value of a darkest pixel in the short column.

In some cases, the second bright grey value for a short column within a respective column of pixels of the distinct columns of pixels 530 can be the grey value of a bottommost pixel in the short column. Additionally, or alternatively, in some cases, the second dark grey value for a short column within a respective column of pixels of the distinct columns of pixels 530 can be the grey value of an uppermost pixel in the short column.

In some cases, at least one of the second bright grey value and the second dark grey value for a short column within a respective column of pixels of the distinct columns of pixels 530 can be determined in accordance with a statistical distribution of the pixel values of the pixels in the short column.

In some cases, the second bright grey value and the second dark grey value for a short column within a respective column of pixels of the distinct columns of pixels 530 can be determined in accordance with a statistical distribution of the pixel values of the pixels in two or more given short columns within respective columns of pixels of the distinct columns of pixels 530. In some cases, the given short columns can be all of the short columns of the distinct columns of pixels 530.

It is noted herein that the determination of the second bright grey value and the second dark grey value for a short column within a respective column of pixels can be made in any number of ways, not limited to the examples provided above.

Returning to the sequence of operations 600 in FIG. 6, image quality control system 400 can be configured, e.g. using controller 420, to determine an error in a position of the substrate 231 relative to the grippers 350 based on the dark-bright transition points as follows.

Image quality control system 400 can be configured to determine the leading end of the gripper edge 233 (i.e., the leading end of the substrate 231) by fitting the dark-bright transition points to a gripper edge model (block 608).

Image quality control system 400 can be configured to subsequently determine the gripper bottom line 520 of the grippers 350 by fitting the dark-bright transition points that are more than a threshold number of pixels from the leading end of the gripper edge 233, being secondary dark-bright transition points, to a grippers model (block 612).

In some cases, the gripper edge model is determined by applying a Random Sample Consensus (RANSAC) algorithm to the dark-bright transition points, and the grippers model is determined by applying the RANSAC algorithm to the secondary dark-bright transition points. In some cases, the gripper edge model and the grippers model can be linear models that are determined by applying an algorithm to the dark-bright transition points and the secondary dark-bright transition points other than the RANSAC algorithm. In some cases, the gripper edge model and the grippers model can be constant value models or high order polynomial function models. It is to be noted that the gripper edge model can be any model to which the dark-bright transition points are fitted, and the grippers model can be any model to which the secondary dark-bright transition points are fitted.

Image quality control system 400 can be configured to compare the leading end of the gripper edge 233 to the gripper bottom line 520 of the grippers 350 (block 616).

Image quality control system 400 can be further configured, based on the comparison of the leading end of the gripper edge 233 to the gripper bottom line 520 of the grippers 350, to determine that at least one criterion of one or more criteria that are indicative of a proper relation between the leading end of the gripper edge 233 and the gripper bottom line 530 of the grippers 350 is not met, being indicative of an error in a position of the substrate 231 relative to the grippers 350 (block 620).

In some cases, the one or more criteria can include a desired displacement range between the leading end of the gripper edge 233 and the gripper bottom line 530 of the grippers 350. In some cases, the desired displacement range can be on the order of a few millimeters (for example, approximately 3 millimeters to approximately 5 mm). In some cases, the desired displacement range can be dependent on a type of the substrate 231.

Additionally, or alternatively, in some cases, the one or more criteria can include a difference between a first slope of the leading end of the gripper edge 233 and a second slope of the gripper bottom line 530 of the grippers 350 that is less than a predefined difference. In some cases, the predefined difference can be on the order of a few milliradians (for example, approximately 3 milliradians to approximately 5 milliradians).

Image quality control system 400 can be further configured to perform one or more actions based on the determination that at least one criterion of one or more criteria that are indicative of a proper relation between the leading end of the gripper edge 233 and the gripper bottom line 530 of the grippers 350 is not met (block 624).

In some cases, the one or more actions can include one or more of the following: (a) providing an alert to an operator of the digital printing system 100, (b) rejecting the substrate 231 or (c) suspending an operation of the digital printing system 100.

In some cases, for a digital printing system 100 that performs an automated duplex printing process, an image quality control system 400 can be configured to monitor front-to-back registration errors in the automated duplex printing process by determining an error in a position of the substrate 231 relative to grippers, in accordance with the sequence of operations 600, based on the ROI 500 of a digital image that is associated with at least a portion of the grippers and at least a portion of a back-side (i.e., second printed side) of the substrate 231.

It is to be noted that, with reference to FIG. 6, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A digital printing system, comprising:

an intermediate transfer member (ITM), including a flexible belt, the ITM being operable to have an ink image formed on a surface thereof;

an impression station configured to transfer the ink image from the surface of the ITM to a substrate, the impression station comprising:

a rotatable impression cylinder having an impression cylinder gap housing one or more grippers operable to grasp and hold a gripper edge of the substrate, being a leading edge of the substrate as it passes through the digital printing system, for conveying the substrate along an axis of rotation of the rotatable impression cylinder during the transfer of the ink image, wherein a trailing end of the gripper edge separates between the gripper edge and a remaining portion of the substrate and coincides with a gripper bottom line of the grippers, and wherein a leading end of the gripper edge is opposite the trailing end of the gripper edge; and a rotatable pressure cylinder operative to rotate synchronously with the rotatable impression cylinder and in an opposing direction thereto to enable the transfer of the ink image as the surface of the ITM on which the ink image has been formed passes between the rotatable pressure cylinder and the rotatable impression cylinder; and an image quality control system comprising:

an imaging device operable, during advancement of the substrate on the rotating impression cylinder, to capture a digital image including a region of interest (ROI) that is associated with at least a portion of the one or more grippers and at least a portion of the substrate, a top edge of the ROI being associated with the at least a portion of the one or more grippers and at least a portion of the gripper edge, and a bottom edge of the ROI being associated with at least a portion of the remaining portion of the substrate; and a controller configured to:

determine a dark-bright transition point for each column of pixels of a plurality of distinct columns of pixels in the ROI, giving rise to dark-bright transition points for the plurality of distinct columns of pixels, wherein each column of pixels of the plurality of distinct columns of pixels extends from a top end of the top edge of the ROI to a bottom end of the bottom edge of the ROI;

determine the leading end of the gripper edge by fitting the dark-bright transition points to a gripper edge model;

subsequently determine the gripper bottom line of the grippers by fitting the dark-bright transition points that are more than a threshold number of pixels from the leading end of the gripper edge, being secondary dark-bright transition points, to a grippers model;

compare the leading end of the gripper edge to the gripper bottom line of the grippers;

determine, based on the compare, that at least one criterion of one or more criteria that are indicative of a proper relation between the leading end of the gripper edge and the gripper bottom line of the grippers is not met, being indicative of an error in a position of the substrate relative to the grippers; and perform one or more actions, based on determining that the at least one criterion is not met.

2. The digital printing system of claim 1, wherein the one or more criteria include a desired displacement range between the leading end of the gripper edge and the gripper bottom line of the grippers.

3. The digital printing system of claim 1, wherein the one or more criteria include a difference between a first slope of the leading end of the gripper edge and a second slope of the gripper bottom line of the grippers that is less than a predefined difference.

4. The digital printing system of claim 1, wherein the controller is configured to determine the dark-bright transition point for each column of pixels of the plurality of distinct columns of pixels by:

providing a representative bright grey value and a representative dark grey value for the respective column of pixels;

calculating a transition grey value for the respective column of pixels, based on the representative bright grey value and the representative dark grey value, the transition grey value being between the representative bright grey value and the representative dark grey value; and searching the respective column of pixels to determine a dark-bright transition pixel of the respective column of pixels, the dark-bright transition pixel having a given pixel grey value that relates to the transition grey value in accordance with a predefined relation;

wherein the dark-bright transition point is the dark-bright transition pixel or a sub-pixel of the dark-bright transition pixel.

5. The digital printing system of claim 4, wherein the predefined relation is one of the following:

(a) the given pixel grey value is either identical to the transition grey value or closest to the transition grey value from among pixel grey values of all of the pixels in the respective column of pixels;

(b) the given pixel grey value is either identical to the transition grey value or closest to the transition grey value from among the pixel grey values of all of the pixels in the respective column of pixels that are less than the transition grey value; or (c) the given pixel grey value is either identical to the transition grey value or closest to the transition grey value from among the pixel grey values of all of the pixels in the respective distinct column of pixels that are greater than the transition grey value.

6. The digital printing system of claim 1, wherein the controller is configured to determine the dark-bright transition point for each column of pixels of the plurality of distinct columns of pixels in the ROI by:

providing a representative bright grey value and a representative dark grey value for the respective column of pixels;

calculating a transition grey value for the respective column of pixels, based on the representative bright grey value and the representative dark grey value, the transition grey value being between the representative bright grey value and the representative dark grey value;

searching the respective column of pixels to determine a dark-bright transition pixel of the respective column of pixels, the dark-bright transition pixel having a given pixel grey value that relates to the transition grey value in accordance with a predefined relation;

defining a short column consisting of a group of pixels within the respective column of pixels that are within a given number of pixels of the dark-bright transition pixel;

providing a second bright grey value and a second dark grey value for the short column;

calculating a second transition grey value for the short column, based on the second bright grey value and the second dark grey value, the second transition grey value being between the second bright grey value and the second dark grey value; and searching the short column for a second dark-bright transition pixel, the second dark-bright transition pixel having a second given pixel grey value that relates to the second transition grey value in accordance with a second predefined relation;

wherein the dark-bright transition point is the second dark-bright transition pixel or a sub-pixel of the second dark-bright transition pixel.

7. The digital printing system of claim 6, wherein the second predefined relation is one of the following:

the second given pixel grey value is either identical to the second transition grey value or closest to the second transition grey value from among pixel grey values of all of the pixels in the short column;

the second given pixel grey value is either identical to the second transition grey value or closest to the second transition grey value from among the pixel grey values of all of the pixels in the short column that are less than the second transition grey value; or the second given pixel grey value is either identical to the second transition grey value or closest to the second transition grey value from among the pixel grey values of all of the pixels in the short column that are greater than the second transition grey value.

8. The digital printing system of claim 1, wherein the gripper edge model is determined by applying a Random Sample Consensus (RANSAC) algorithm to the dark-bright transition points, and wherein the grippers model is determined by applying the RANSAC algorithm to the secondary dark-bright transition points.

9. The digital printing system of claim 1, wherein the actions include one or more of the following: (a) providing an alert to an operator of the digital printing system, (b) rejecting the substrate or (c) suspending an operation of the digital printing system.

10. A method for performing quality control in a digital printing system, the digital printing system comprising:

an intermediate transfer member (ITM), including a flexible belt, the ITM being operable to have an ink image formed on a surface thereof;

an impression station configured to transfer the ink image from the surface of the ITM to a substrate, the impression station comprising:

a rotatable impression cylinder having an impression cylinder gap housing one or more grippers operable to grasp and hold a gripper edge of the substrate, being a leading edge of the substrate as it passes through the digital printing system, for conveying the substrate along an axis of rotation of the rotatable impression cylinder during the transfer of the ink image, wherein a trailing end of the gripper edge separates between the gripper edge and a remaining portion of the substrate and coincides with a gripper bottom line of the grippers, and wherein a leading end of the gripper edge is opposite the trailing end of the gripper edge; and a rotatable pressure cylinder operative to rotate synchronously with the rotatable impression cylinder and in an opposing direction thereto to enable the transfer of the ink image as the surface of the ITM on which the ink image has been formed passes between the rotatable pressure cylinder and the rotatable impression cylinder; and an image quality control system comprising:

an imaging device operable, during advancement of the substrate on the rotating impression cylinder, to capture a digital image including a region of interest (ROI) that is associated with at least a portion of the one or more grippers and at least a portion of the substrate, a top edge of the ROI being associated with the at least a portion of the one or more grippers and at least a portion of the gripper edge, and a bottom edge of the ROI being associated with at least a portion of the remaining portion of the substrate; and a controller;

the method, performed by the controller, and comprising:

determining a dark-bright transition point for each column of pixels of a plurality of distinct columns of pixels in the ROI, giving rise to dark-bright transition points for the plurality of distinct columns of pixels, wherein each column of pixels of the plurality of distinct columns of pixels extends from a top end of the top edge of the ROI to a bottom end of the bottom edge of the ROI;

determining the leading end of the gripper edge by fitting the dark-bright transition points to a gripper edge model;

subsequently determining the gripper bottom line of the grippers by fitting the dark-bright transition points that are more than a threshold number of pixels from the leading end of the gripper edge, being secondary dark-bright transition points, to a grippers model;

comparing the leading end of the gripper edge to the gripper bottom line of the grippers;

determining, based on the comparing, that at least one criterion of one or more criteria that are indicative of a proper relation between the leading end of the gripper edge and the gripper bottom line of the grippers is not met, being indicative of an error in a position of the substrate relative to the grippers; and performing one or more actions, based on determining that the at least one criterion is not met.

11. The method of claim 10, wherein the ROI is associated with all of a width of the substrate.

12. The method of claim 10, wherein the one or more criteria include a desired displacement range between the leading end of the gripper edge and the gripper bottom line of the grippers.

13. The method of claim 10, wherein the one or more criteria include a difference between a first slope of the leading end of the gripper edge and a second slope of the gripper bottom line of the grippers that is less than a predefined difference.

14. The method of claim 10, wherein determining the dark-bright transition point for each column of pixels of the plurality of distinct columns of pixels is performed by:

providing a representative bright grey value and a representative dark grey value for the respective column of pixels;

calculating a transition grey value for the respective column of pixels, based on the representative bright grey value and the representative dark grey value, the transition grey value being between the representative bright grey value and the representative dark grey value; and searching the respective column of pixels to determine a dark-bright transition pixel of the respective column of pixels, the dark-bright transition pixel having a given pixel grey value that relates to the transition grey value in accordance with a predefined relation;

wherein the dark-bright transition point is the dark-bright transition pixel or a sub-pixel of the dark-bright transition pixel.

15. The method of claim 14, wherein the predefined relation is one of the following:

(a) the given pixel grey value is either identical to the transition grey value or closest to the transition grey value from among pixel grey values of all of the pixels in the respective column of pixels;

(b) the given pixel grey value is either identical to the transition grey value or closest to the transition grey value from among the pixel grey values of all of the pixels in the respective column of pixels that are less than the transition grey value; or (c) the given pixel grey value is either identical to the transition grey value or closest to the transition grey value from among the pixel grey values of all of the pixels in the respective distinct column of pixels that are greater than the transition grey value.

16. The method of claim 10, wherein determining the dark-bright transition point for each column of pixels of the plurality of distinct columns of pixels in the ROI is performed by:

providing a representative bright grey value and a representative dark grey value for the respective column of pixels;

calculating a transition grey value for the respective column of pixels, based on the representative bright grey value and the representative dark grey value, the transition grey value being between the representative bright grey value and the representative dark grey value;

searching the respective column of pixels to determine a dark-bright transition pixel of the respective column of pixels, the dark-bright transition pixel having a given pixel grey value that relates to the transition grey value in accordance with a predefined relation;

defining a short column consisting of a group of pixels within the respective column of pixels that are within a given number of pixels of the dark-bright transition pixel;

providing a second bright grey value and a second dark grey value for the short column;

calculating a second transition grey value for the short column, based on the second bright grey value and the second dark grey value, the second transition grey value being between the second bright grey value and the second dark grey value; and searching the short column for a second dark-bright transition pixel, the second dark-bright transition pixel having a second given pixel grey value that relates to the second transition grey value in accordance with a second predefined relation;

wherein the dark-bright transition point is the second dark-bright transition pixel or a sub-pixel of the second dark-bright transition pixel.

17. The method of claim 16, wherein the second predefined relation is one of the following:

the second given pixel grey value is either identical to the second transition grey value or closest to the second transition grey value from among pixel grey values of all of the pixels in the short column;

the second given pixel grey value is either identical to the second transition grey value or closest to the second transition grey value from among the pixel grey values of all of the pixels in the short column that are less than the second transition grey value; or the second given pixel grey value is either identical to the second transition grey value or closest to the second transition grey value from among the pixel grey values of all of the pixels in the short column that are greater than the second transition grey value.

18. The method of claim 10, wherein the gripper edge model is determined by applying a Random Sample Consensus (RANSAC) algorithm to the dark-bright transition points, and wherein the grippers model is determined by applying the RANSAC algorithm to the secondary dark-bright transition points.

19. The method of claim 10, wherein the actions include one or more of the following: (a) providing an alert to an operator of the digital printing system, (b) rejecting the substrate or (c) suspending an operation of the digital printing system.

20. A non-transitory computer readable storage medium having computer readable program code embodied therein, the computer readable program code executable by a controller of a digital printing system to perform a method for performing quality control in the digital printing system, the digital printing system comprising:

an intermediate transfer member (ITM), including a flexible belt, the ITM being operable to have an ink image formed on a surface thereof;

an impression station configured to transfer the ink image from the surface of the ITM to a substrate, the impression station comprising:

a rotatable impression cylinder having an impression cylinder gap housing one or more grippers operable to grasp and hold a gripper edge of the substrate, being a leading edge of the substrate as it passes through the digital printing system, for conveying the substrate along an axis of rotation of the rotatable impression cylinder during the transfer of the ink image, wherein a trailing end of the gripper edge separates between the gripper edge and a remaining portion of the substrate and coincides with a gripper bottom line of the grippers, and wherein a leading end of the gripper edge is opposite the trailing end of the gripper edge; and a rotatable pressure cylinder operative to rotate synchronously with the rotatable impression cylinder and in an opposing direction thereto to enable the transfer of the ink image as the surface of the ITM on which the ink image has been formed passes between the rotatable pressure cylinder and the rotatable impression cylinder; and an image quality control system comprising:

an imaging device operable, during advancement of the substrate on the rotating impression cylinder, to capture a digital image including a region of interest (ROI) that is associated with at least a portion of the one or more grippers and at least a portion of the substrate, a top edge of the ROI being associated with the at least a portion of the one or more grippers and at least a portion of the gripper edge, and a bottom edge of the ROI being associated with at least a portion of the remaining portion of the substrate; and the controller;

the method comprising:

determining a dark-bright transition point for each column of pixels of a plurality of distinct columns of pixels in the ROI, giving rise to dark-bright transition points for the plurality of distinct columns of pixels, wherein each column of pixels of the plurality of distinct columns of pixels extends from a top end of the top edge of the ROI to a bottom end of the bottom edge of the ROI;

determining the leading end of the gripper edge by fitting the dark-bright transition points to a gripper edge model;

subsequently determining the gripper bottom line of the grippers by fitting the dark-bright transition points that are more than a threshold number of pixels from the leading end of the gripper edge, being secondary dark-bright transition points, to a grippers model;

comparing the leading end of the gripper edge to the gripper bottom line of the grippers;

determining, based on the comparing, that at least one criterion of one or more criteria that are indicative of a proper relation between the leading end of the gripper edge and the gripper bottom line of the grippers is not met, being indicative of an error in a position of the substrate relative to the grippers; and performing one or more actions, based on determining that the at least one criterion is not met.

* * * * *